(12) United States Patent
Redon et al.

(10) Patent No.: US 11,598,259 B2
(45) Date of Patent: Mar. 7, 2023

(54) HYBRID DRIVE SYSTEM WITH AN OPPOSED-PISTON, INTERNAL COMBUSTION ENGINE

(71) Applicant: ACHATES POWER, INC., San Diego, CA (US)

(72) Inventors: Fabien G. Redon, San Diego, CA (US); Ashwin A. Salvi, San Diego, CA (US)

(73) Assignee: Achates Power, Inc., San Diego, CA (US)

( * ) Notice: Subject to any disclaimer, the term of this patent is extended or adjusted under 35 U.S.C. 154(b) by 292 days.

(21) Appl. No.: 16/555,952

(22) Filed: Aug. 29, 2019

(65) Prior Publication Data

US 2021/0061255 A1    Mar. 4, 2021

(51) Int. Cl.

| | |
|---|---|
| B60K 1/02 | (2006.01) |
| F02B 75/28 | (2006.01) |
| B60K 6/26 | (2007.10) |
| B60K 6/28 | (2007.10) |
| B60K 6/30 | (2007.10) |
| B60K 6/46 | (2007.10) |
| B60K 17/22 | (2006.01) |
| F01B 7/14 | (2006.01) |
| F02N 11/04 | (2006.01) |
| B60K 6/38 | (2007.10) |
| B60K 17/02 | (2006.01) |

(52) U.S. Cl.
CPC ............... *F02B 75/28* (2013.01); *B60K 1/02* (2013.01); *B60K 6/26* (2013.01); *B60K 6/28* (2013.01); *B60K 6/30* (2013.01); *B60K 6/46* (2013.01); *B60K 17/22* (2013.01); *F01B 7/14* (2013.01); *F02N 11/04* (2013.01); *B60K 6/38* (2013.01); *B60K 17/02* (2013.01); *B60K 2006/268* (2013.01)

(58) Field of Classification Search
CPC .. F02B 75/28; B60K 6/26; B60K 6/28; B60K 6/46; F02N 11/04
See application file for complete search history.

(56) References Cited

U.S. PATENT DOCUMENTS

| | | | |
|---|---|---|---|
| 2,031,318 A | 11/1929 | Junkers | |
| 2,401,188 A | 3/1943 | Prince | |

(Continued)

FOREIGN PATENT DOCUMENTS

| | | | | |
|---|---|---|---|---|
| CN | 103016150 A | 4/2014 | ............. | F02B 75/28 |
| CN | 105240120 A | 1/2016 | ............. | F02B 75/28 |

(Continued)

OTHER PUBLICATIONS

International Search Report & Written Opinion dated Nov. 26, 2020 for International Application No. PCT/US2020/046850.

(Continued)

*Primary Examiner* — James M Dolak
*Assistant Examiner* — James J Triggs
(74) *Attorney, Agent, or Firm* — Terrance A. Meador

(57) ABSTRACT

A hybrid drive system has two sources of driving power: a non-combustion drive system to provide mechanical torque and rotation to a driveshaft, and an opposed-piston, internal combustion engine configured to provide energy for the non-combustion drive system.

8 Claims, 6 Drawing Sheets

(56) References Cited

U.S. PATENT DOCUMENTS

| | | | | |
|---|---|---|---|---|
| 3,702,057 | A * | 11/1972 | Rabiger | F16H 43/00 |
| | | | | 60/538 |
| 3,842,287 | A | 10/1974 | Nakamura | |
| 4,331,111 | A * | 5/1982 | Bennett | F02B 63/04 |
| | | | | 123/197.1 |
| 4,532,431 | A * | 7/1985 | Iliev | F02B 63/04 |
| | | | | 123/46 E |
| 4,856,463 | A * | 8/1989 | Johnston | F01B 7/14 |
| | | | | 123/51 BA |
| 4,924,956 | A * | 5/1990 | Deng | F02B 71/04 |
| | | | | 123/46 E |
| 5,172,784 | A * | 12/1992 | Varela, Jr. | B60L 15/2036 |
| | | | | 180/65.245 |
| 5,345,154 | A | 9/1994 | King | H02P 7/67 |
| 5,589,743 | A | 12/1996 | King | B60L 11/08 |
| 6,054,844 | A | 4/2000 | Frank | H02P 9/04 |
| 6,170,443 | B1 * | 1/2001 | Hofbauer | F02B 25/08 |
| | | | | 123/51 B |
| 6,182,619 | B1 * | 2/2001 | Spitzer | F02B 25/08 |
| | | | | 123/51 B |
| 7,931,102 | B2 | 4/2011 | Katsuta et al. | B60K 6/44 |
| 8,122,983 | B2 | 2/2012 | Katsuta et al. | B60K 6/44 |
| 8,290,653 | B2 | 10/2012 | Hofbauer | B60L 9/00 |
| 8,297,198 | B2 | 10/2012 | Read | B61C 3/00 |
| 8,413,619 | B2 * | 4/2013 | Cleeves | F01B 7/02 |
| | | | | 123/78 F |
| 8,718,854 | B2 | 5/2014 | Hashimoto | B60L 11/00 |
| 8,936,119 | B1 * | 1/2015 | Valler | B60K 6/40 |
| | | | | 180/65.21 |
| 9,032,918 | B2 * | 5/2015 | Mikalsen | F01B 11/004 |
| | | | | 123/46 R |
| 9,206,749 | B2 | 12/2015 | Cleeves | F02D 15/02 |
| 9,316,150 | B2 | 4/2016 | Cleeves | F02B 75/04 |
| 10,190,492 | B2 | 1/2019 | Fuqua et al. | F02B 75/28 |
| 10,730,394 | B2 * | 8/2020 | Ayala | B60K 1/04 |
| 2008/0023238 | A1 * | 1/2008 | Shimizu | B60W 20/00 |
| | | | | 180/65.23 |
| 2008/0176707 | A1 * | 7/2008 | Yamamoto | B60K 6/40 |
| | | | | 477/5 |
| 2010/0282219 | A1 * | 11/2010 | Alonso | F02F 1/186 |
| | | | | 123/51 AA |
| 2012/0215426 | A1 | 8/2012 | Sato et al. | F02D 41/26 |
| 2012/0285422 | A1 | 11/2012 | Exner et al. | F02B 75/28 |
| 2015/0197239 | A1 * | 7/2015 | Vilar | B60K 6/46 |
| | | | | 477/5 |
| 2015/0203094 | A1 | 7/2015 | Basset et al. | B60W 20/00 |
| 2017/0204801 | A1 | 7/2017 | Sharma et al. | F02D 41/30 |
| 2017/0313195 | A1 | 11/2017 | Olivier | B60L 11/12 |
| 2017/0356321 | A1 * | 12/2017 | Ernst | F01N 13/10 |
| 2018/0229713 | A1 | 8/2018 | Gagnon et al. | B60W 20/13 |
| 2010/0341104 | | 11/2019 | Redon | F02B 7/04 |
| 2021/0054781 | A1 * | 2/2021 | Nishida | F02B 75/282 |

FOREIGN PATENT DOCUMENTS

| | | | |
|---|---|---|---|
| EP | 3741970 A1 | 11/2020 | F02B 75/28 |
| WO | WO 2007/010186 A1 | 1/2007 | F02B 75/28 |
| WO | WO 2019/139056 A1 | 7/2019 | F02B 75/28 |

OTHER PUBLICATIONS

Herold, R., Wahl, M., Regner, G., Lemke, J., and Foster, D., (2011), "Thermodynamic Benefits of Opposed-Piston Two-Stroke Engines," SAE Technical Paper 2011-01-2216, 2011 (published 2011).

Kalebjian, C., Redon, F., and Wahl, M., (2012), "Low Emissions and Rapid Catalyst Light-Off Capability for Upcoming Regulations with an Opposed-Piston, Two-Stroke Diesel Engine", Global Automotive Management Council and Emissions 2012, Ypsilanti, MI. (published 2012).

Hanson, R., Strauss, S., Redon, F., Salvi, A., (2017), "Progress in Light-Duty OPGCI Engine Design and Testing," SIA Powertrain International Conference, Versailles (published 2017).

U.S. Appl. No. 16/661,334, filed Oct. 23, 2019, for "Dual Crankshaft, Opposed-Piston Engine with Mechanically Uncoupled Crankshafts", Ashwin A. Salvi.

Non-Final Office Action dated Oct. 5, 2020, in U.S. Appl. No. 16/661,334, filed Oct. 23, 2019, for "Dual Crankshaft Opposed-Piston Engine with Mechanically Uncoupled Crankshafts", Ashwin A. Salvi.

Amendment and Request for Reconsideration dated Jan. 5, 2021, in U.S. Appl. No. 16/661,334, filed Oct. 23, 2019, for "Dual Crankshaft, Opposed-Piston Engine with Mechanically Uncoupled Crankshafts", Aswhin A. Salvi.

* cited by examiner

HYBRID DRIVE SYSTEM WITH AN OPPOSED-PISTON, INTERNAL COMBUSTION ENGINE

FIELD OF THE INVENTION

The invention relates to hybrid drive systems. In particular, the invention concerns a hybrid drive system for a vehicle in which a non-combustion driving device provides mechanical torque and rotation to a driveshaft and an opposed-piston, internal combustion engine device provides energy for the non-combustion drive system.

BACKGROUND OF THE INVENTION

Various international considerations are propelling demands to increase the energy efficiency and reduce the undesirable emissions of vehicles powered by internal combustion engines. These objectives have led to development of electric vehicles and hybrid electric powertrains for vehicles. A conventional internal combustion engine provides a low cost platform with high power and energy density, which meets consumer expectations of vehicle range, but continues to exhibit low fuel efficiency. Electric vehicles produce a lower carbon signature (assuming a low $CO_2$ electrical grid) with good vehicle drivability characteristics. However the energy impact of electric vehicles is low due to low sales volume, high cost, low infrastructure support, and limited vehicle range. Increasingly, hybrid electric vehicles offer a desirable combination of both driving technologies in terms of range, convenience, and increased efficiency. However, efficiency and emission limits of currently-configured conventional internal combustion engines increasingly constrain the potential benefits of hybrid electric vehicles. Accordingly, improving the internal combustion efficiency and emissions characteristics of these vehicles can have a significant beneficial impact on global energy consumption and emissions.

An analytical investigation has indicated that opposed-piston engines possess a fundamental fuel efficiency advantage over conventional internal combustion engines. Herold, R., Wahl, M., Regner, G., Lemke, J., and Foster, D., (2011). "Thermodynamic Benefits of Opposed-Piston Two-Stroke Engines," SAE Technical Paper 2011-01-2216, 2011. Another investigation confirms the potential of opposed-piston engines for meeting stringent emissions regulations, particularly those relating to NOx. Kalebjian, C., Redon, F., and Wahl, M., (2012), "Low Emissions and Rapid Catalyst Light-Off Capability for Upcoming Regulations with an Opposed-Piston, Two-Stroke Diesel Engine", Global Automotive Management Council and Emissions 2012, Ypsilanti, Mi. Recent advances in gasoline-powered opposed-piston engine performance indicate that significant margins in fuel efficiency and emissions are achievable over the conventional two- and four-stroke internal combustion engines used in hybrid applications. Hanson, R., Strauss, S., Redon, F., Salvi, A., (2017), "Progress in Light-Duty OPGCI Engine Design and Testing," SIA Powertrain International Conference, Versailles.

However, to date, hybrid drive systems for vehicles such as automobiles, busses, and trucks have been designed and adapted for conventional internal combustion engine architectures based on single-piston-per-cylinder configurations. Accordingly, it is desirable to consider replacement of a conventional internal combustion engine in a hybrid drive system with an opposed-piston, internal combustion engine in order to obtain increases in fuel efficiency and to reduce undesirable emissions of the internal combustion component of a hybrid drive system.

SUMMARY OF THE INVENTION

In view of the drive to reduce or eliminate the undesirable efficiency and emissions features associated with conventional internal combustion engines, a hybrid drive system according to the invention comprising two sources of power is constructed such that a non-combustion driving device provides mechanical torque and rotation for a driveshaft, and an opposed-piston, internal combustion engine device provides energy for the non-combustion driving device to an energy-accumulating device which supplies power to the non-combustion driving device.

According to the invention, a hybrid drive system may include an opposed-piston, internal-combustion engine, a power transducer device coupled to be driven by the opposed-piston, internal combustion engine, and, a hybrid powertrain system configured to receive power from the power transducer device.

Preferably, the hybrid powertrain system may comprise a first electric motor/generator device and the power transducer device may comprise a second electric motor/generator device.

In some instances, the opposed-piston, internal combustion engine may comprise a first crankshaft, a second crankshaft, and a mechanical connection interlinking the first crankshaft and the second crankshaft, and a motor shaft of the second electric motor/generator device may be coupled to one of the first crankshaft, the second crankshaft, and the mechanical connection.

In other instances, the opposed-piston, internal combustion engine may comprise a first crankshaft, a second crankshaft, and a mechanical connection interlinking the first crankshaft and the second crankshaft, the power transducer device may comprise a third electric motor/generator device, a motor shaft of the second electric motor/generator device may be coupled to the first crankshaft, and a motor shaft of the third electric motor/generator device may be coupled to the second crankshaft.

In further instances, the opposed-piston, internal combustion engine may comprise a first crankshaft and a second crankshaft, the power transducer device may further comprise a third electric motor/generator device, and a motor shaft of the second electric motor/generator device may be coupled to the first crankshaft, and a motor shaft of the third electric motor/generator device may be coupled to the second crankshaft.

From other aspects, the invention may relate to a serial hybrid system or an extended-range electric engine system constructed such that an electric driving device is configured to provide mechanical torque and rotation to a driveshaft and an opposed-piston, internal combustion engine device is configured to provide electrical energy for the electric driving device to an electrical energy-accumulating device for supplying power to the electric driving device.

DETAILED DESCRIPTION OF EMBODIMENTS OF THE INVENTION

An opposed-piston engine is an internal-combustion engine characterized by an arrangement of two pistons disposed in the bore of a cylinder for reciprocating movement in opposing directions along a longitudinal axis of the cylinder. An opposed-piston, internal combustion engine differs in many respects from a conventional internal combustion engine, which has a single piston in a cylinder. In an opposed-piston engine, a combustion chamber is formed in a cylinder, between the end surfaces of two opposed pistons moving in the cylinder; in a conventional engine, a combustion chamber is formed between a cylinder head and the end surface of the single piston moving in the cylinder. In an opposed-piston engine, air enters the cylinder through a piston-controlled intake port that opens through the cylinder near one of its two ends, and exhaust exits the cylinder through a piston-controlled exhaust port that opens through the cylinder near the other of its two ends. In a conventional engine air and exhaust pass through one end of the cylinder via respective valve-controlled intake and exhaust ports in the cylinder head.

Typically, an opposed-piston engine completes a cycle of operation with a single complete rotation of a crankshaft and two strokes of a piston connected to the crankshaft. The strokes are denoted as compression and power strokes. Each piston moves between a bottom center (BC) region in the cylinder where it is nearest a respective end of the cylinder and furthest from the other piston, and a top center (TC) region within the cylinder where it is furthest from the respective end and closest to the other piston. The cylinder has ports near respective BC regions. Each of the opposed pistons controls a respective one of the ports, opening the port as it moves to its BC region, and closing the port as it moves from BC toward its TC region. One port serves to admit charge air (sometimes called "scavenging air") into the bore, the other port provides passage for the products of combustion out of the bore; these are respectively termed "intake" and "exhaust" ports (in some descriptions, intake ports are referred to as "air" ports or "scavenge" ports). In a uniflow-scavenged, opposed-piston engine, as pressurized charge air enters a cylinder through its intake port near one end of a cylinder, exhaust gas flows out of its exhaust port near the opposite end; thus gas flows through the cylinder in a single direction ("uniflow")—from intake port to exhaust port.

Figure 1:
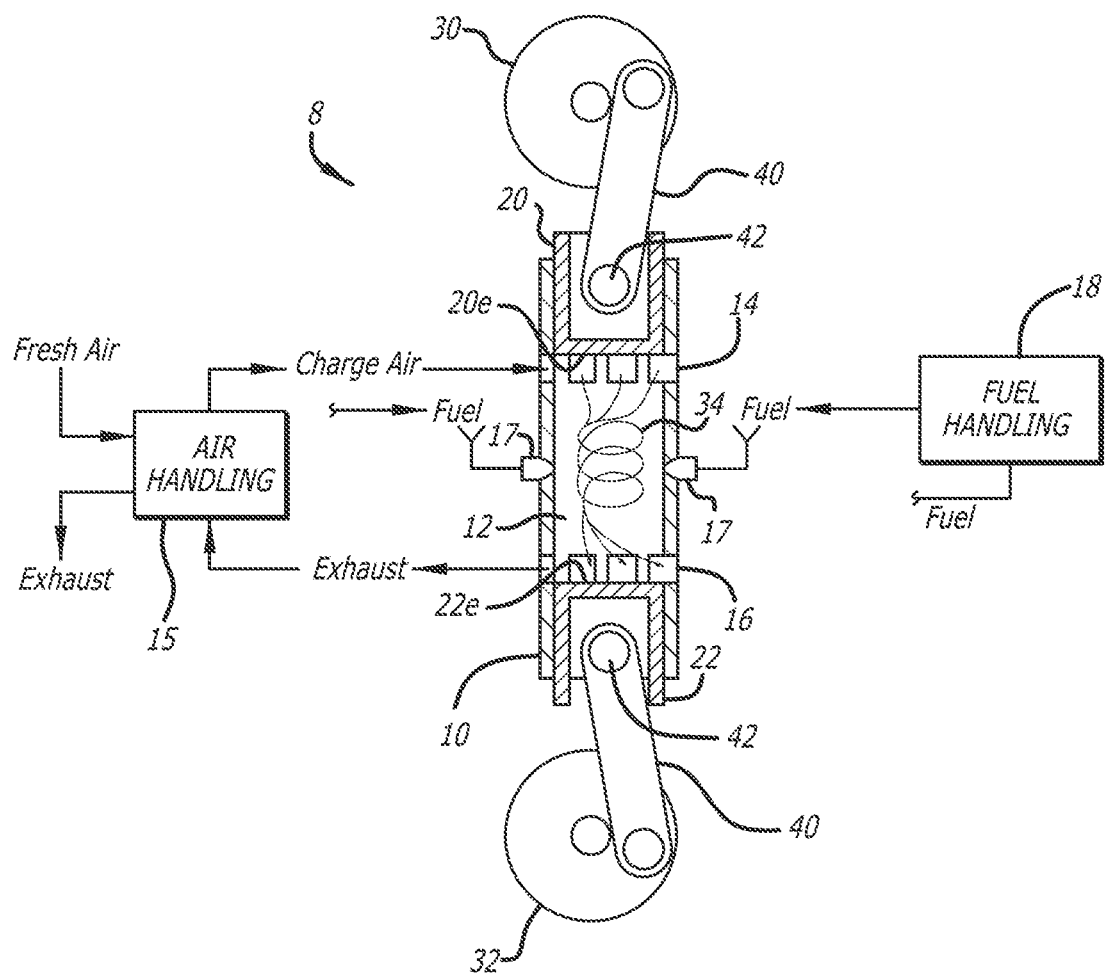
FIG. 1 is a schematic illustration of an exemplary opposed-piston, internal combustion engine of the prior art.

FIG. 1 is a schematic representation of an exemplary opposed-piston engine. Preferably, the engine is a two-stroke cycle, uniflow-scavenged, opposed-piston engine (hereinafter, "the opposed-piston engine 8") that includes at least one cylinder. The opposed-piston engine may be operated on the compression-ignition principle, or it may operate with electronic or optical ignition assistance. The opposed-piston engine 8 may have one cylinder, or it may comprise two cylinders, or three or more cylinders. In any event, the cylinder 10 represents both single cylinder and multi-cylinder configurations of the opposed-piston engine 8. The cylinder 10 includes a bore 12 and longitudinally spaced-apart intake and exhaust ports 14 and 16 machined, molded, or otherwise formed in the cylinder, near respective ends thereof. An air handling system 15 of the opposed-piston engine 8 manages the transport of charge air 34 into, and exhaust out of, the engine by way of these ports. Each of the intake and exhaust ports includes one or more openings communicating between the cylinder bore and an associated manifold or plenum. In many cases a port comprises one or more circumferential arrays of openings in which adjacent openings are separated by a solid portion of the cylinder wall (also called a "bridge" or a "bar"). In some descriptions, each opening is referred to as a "port"; however, the construction of a circumferential array of such "ports" is no different than the port constructions illustrated in FIG. 1. Fuel injectors 17 include nozzles that are secured in holes that open into the cylinder. A fuel system 18 of the opposed-piston engine 8 provides fuel for direct side injection by the injectors 17 into the cylinder. Two pistons 20, 22 are disposed in the bore 12 with their end surfaces 20e, 22e in opposition to each other. For convenience, the piston 20 is referred to as the "intake" piston because it opens and closes the intake port 14. Similarly, the piston 22 is referred to as the "exhaust" piston because it opens and closes the exhaust port 16. Preferably, but not necessarily, the intake piston 20 and all other intake pistons are coupled to a crankshaft 30 of the opposed-piston engine 8; and, the exhaust piston 22 and all other exhaust pistons are coupled to a crankshaft 32 of the engine 8.

In response to combustion occurring between their end surfaces, the opposed pistons move away from respective TC locations where they are at their innermost positions in the cylinder 10. While moving from their TC locations, the pistons keep their associated ports closed until they approach respective BC locations where they are at their outermost positions in the cylinder and their associated ports are open. As charge air flows into the cylinder 10 through the intake port 14, the shapes of the intake port openings and surface features of the opposed piston end surfaces induce turbulence in the charge air which promotes air/fuel mixing, effective combustion, and reduction of pollutants.

Figure 2:
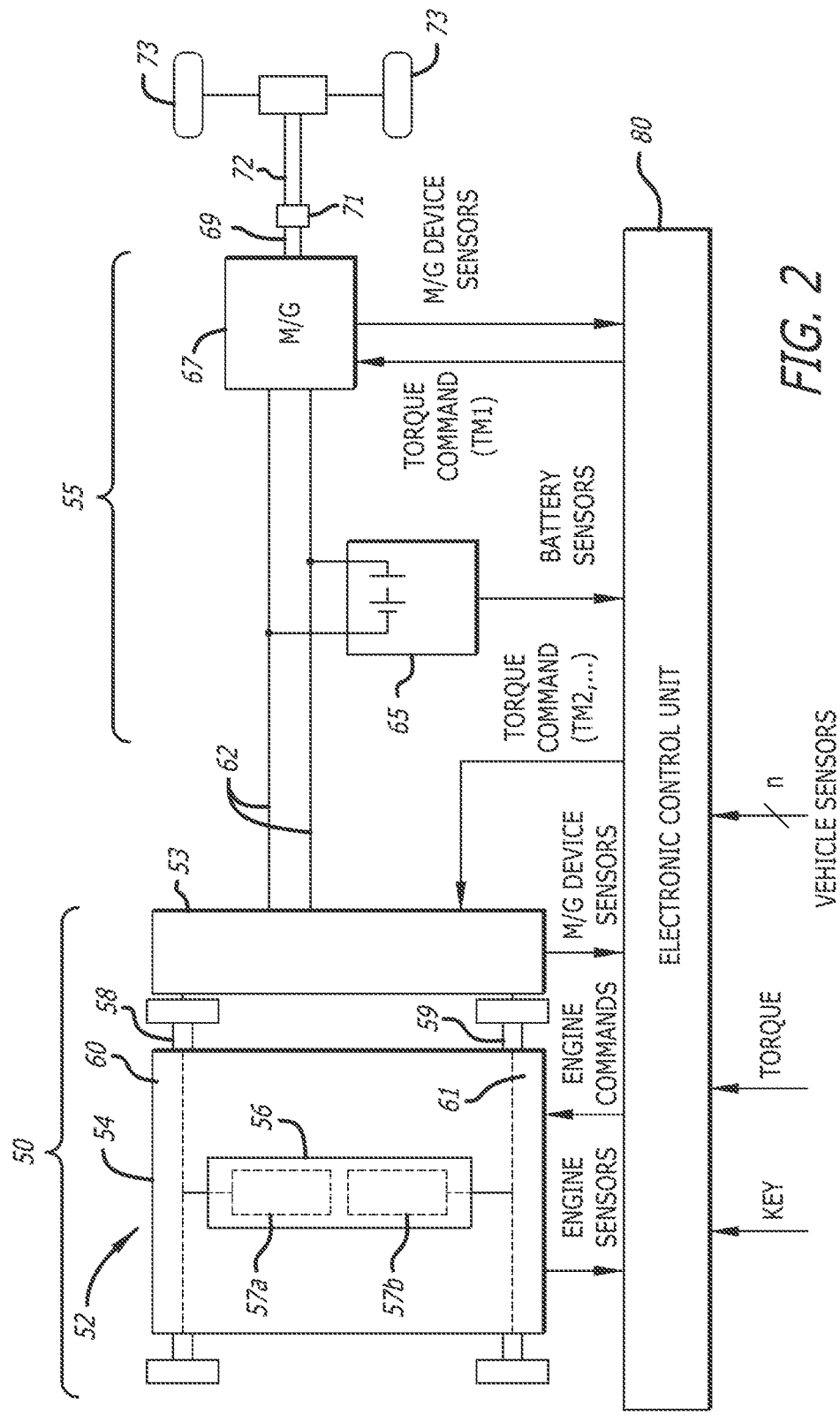
FIG. 2 is a schematic illustration of an opposed-piston, internal combustion engine device configured for use in a hybrid drive system according to the invention.

FIG. 2 illustrates an opposed-piston, internal combustion engine device ("opposed-piston engine device") in a hybrid drive system according to the invention. The opposed-piston engine device 50 includes an opposed-piston engine 52 constructed and operated in a manner illustrated in FIG. 1 and a power transducer device 53 operated by mechanical power transmitted from the opposed-piston engine. The opposed-piston engine 52 may comprise an engine block 54 containing at least one cylinder 56 disposed between two spaced-apart crankshafts 58 and 59. For example, the opposed-piston engine 52 may comprise one, two, or three or more cylinders. In any event, the cylinder 56 represents both single cylinder and multi-cylinder configurations of the opposed-piston engine 52. The two crankshafts 58 and 59 are supported for rotation in respective crankcase portions 60 and 61 of the engine block 54. The power transducer device 53 is adapted to convert the mechanical rotation of the crankshafts to a particular form of power which is output to be used by the non-combustion elements of an electrically-powered hybrid drive system type, a hydraulically-powered hybrid drive system type, or a pneumaticallypowered hybrid drive system type. Two pistons 57*a* and 57*b* are disposed in the bore of the cylinder 56 for reciprocating movement in opposing directions along a longitudinal axis of the cylinder 56. The piston 57*a* is coupled to the crankshaft 58 and the piston 57*b* is coupled to the crankshaft 59.

The examples and embodiments of the invention which are shown and discussed hereafter are directed toward an electrically-powered hybrid drive system type, although this is not intended to exclude application of the invention to other hybrid drive system types. These examples and embodiments are also directed to an application comprising a wheeled hybrid vehicle. This application is for illustration only, and is not intended to exclude other types of platform applications, which may include, without limitation, wheeled hybrid vehicles such as automobiles, vans, trucks, and busses, agricultural, construction, and mining vehicles, military vehicles, maritime and fresh-water vessels, locomotives, and aircraft.

With further reference to FIG. 2, the power transducer device 53 is adapted to convert the mechanical rotation of the crankshafts 58 and 59 to electrical energy which the power transducer device 53 outputs to a hybrid powertrain system of the electrical type. The electrical hybrid powertrain system may comprise a storage battery device 65 and at least one electrical motor device, in this case a motor/generator device 67. The power transducer device 53 is coupled for delivery of electrical power to the hybrid powertrain system 55 by electrical bus lines 62. An AC motor part of the electrical motor/generator device 67 has an associated rotating motor shaft 69 that may be coupled to provide mechanical torque and rotation to one or more wheels of a hybrid vehicle by way of one or more of a driveshaft, an axle, and a hub flange. For example, the electrical motor/generator device 67 may be coupled through a transmission assembly 71 to a driveshaft 72 for provision to one or more wheels 73 of a hybrid vehicle. Alternatively, the hybrid powertrain system may comprise one or more motor/generator devices to drive each of a plurality of wheels of a multi-wheeled hybrid vehicle via a hub flange at each wheel.

A hybrid drive system according to the invention may also include a control mechanization, which is a computer-based system comprising a programmed controller, a plurality of sensors, a number of actuators, and other machines devices distributed throughout the hybrid drive system and/or the hybrid vehicle. The control mechanization governs operations of various components of the hybrid drive system. The programmed controller includes one or more control units (CUs) electrically connected to associated sensors, actuators, and other machine devices. As per FIG. 2, control of the opposed-piston engine device 50 and the hybrid powertrain system 55 (and, possibly, other systems associated with the hybrid drive system) is implemented by a control mechanization that includes a programmed electronic control unit (ECU) 80. The ECU 80 may be constituted with one or more microprocessors, memory, I/O portions, converters, drivers, and so on, and is programmed to execute control algorithms under various hybrid drive system operating conditions. Such algorithms may be embodied in control modules that are part of a system control program executed by the ECU 80 to regulate operations of the hybrid drive system. In some instances, the algorithms may be constructed and executed for a wheeled hybrid vehicle operated in a manual mode or in an autonomous, self-driving mode.

In addition to the ECU 80, the control mechanization may also comprise various sensors (physical and/or virtual). These may include vehicle operation sensors (key, shift, acceleration demand, brake demand, vehicle speed, etc.). Hybrid drive system sensors may include engine sensors (engine operating state, engine speed, engine systems, etc.), motor sensors (motor speed, generator current, etc.), and battery condition sensors (state of charge, voltage, current, temperature, etc.). Further, the control mechanization may comprise various actuators such as are found in the fuel, air handling, and cooling systems of an opposed-piston engine. In this regard, see, for example, PCT publications WO 2013/062921 A1 and WO 2015/026628 A1. The control mechanization may further comprise various actuators for motor, generator, and battery devices (converters, inverters, etc.).

Figure 4:
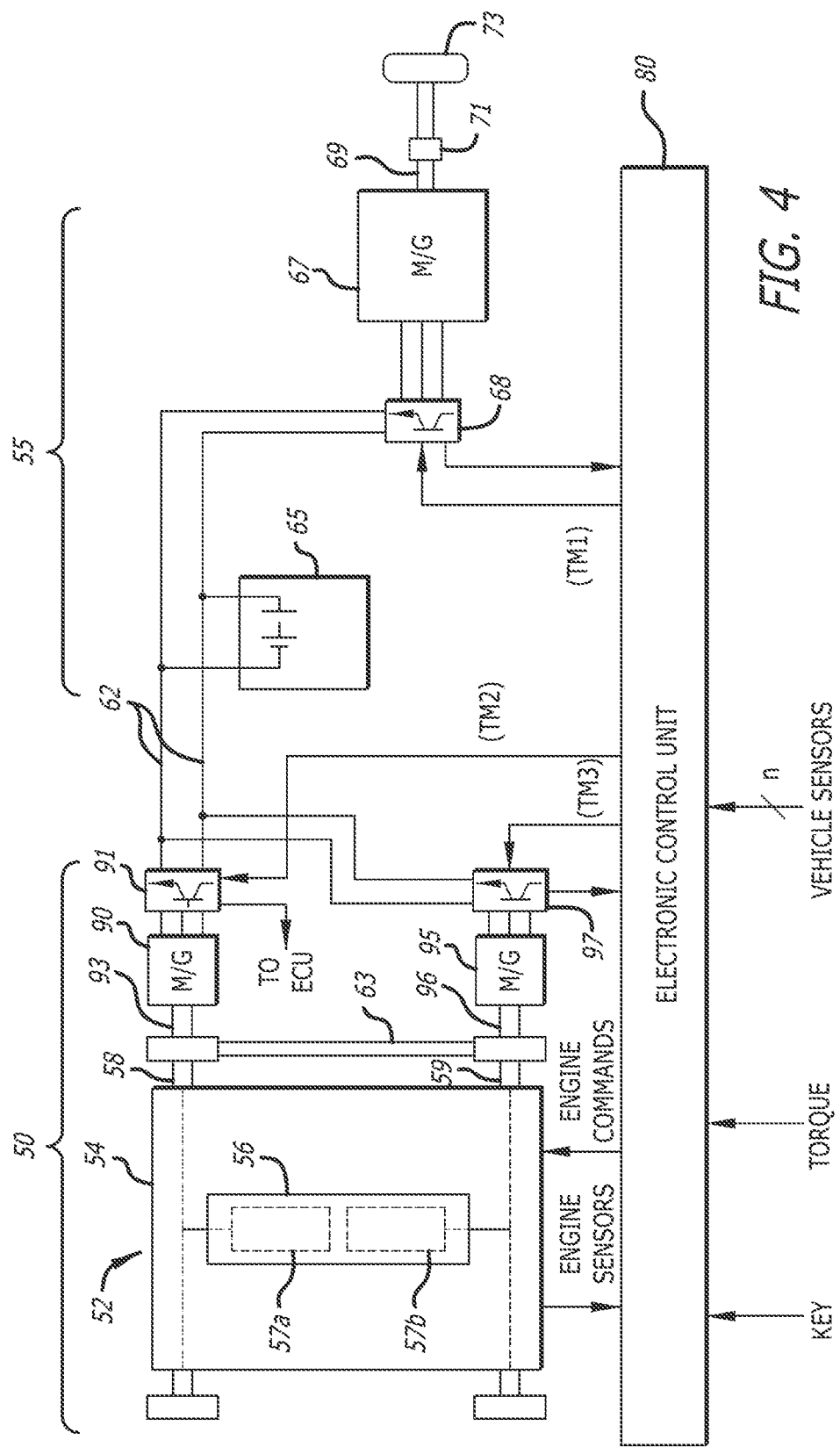
FIG. 4 is a schematic illustration of a second embodiment of a hybrid drive system configured in a series arrangement according to the invention.
Figure 5:
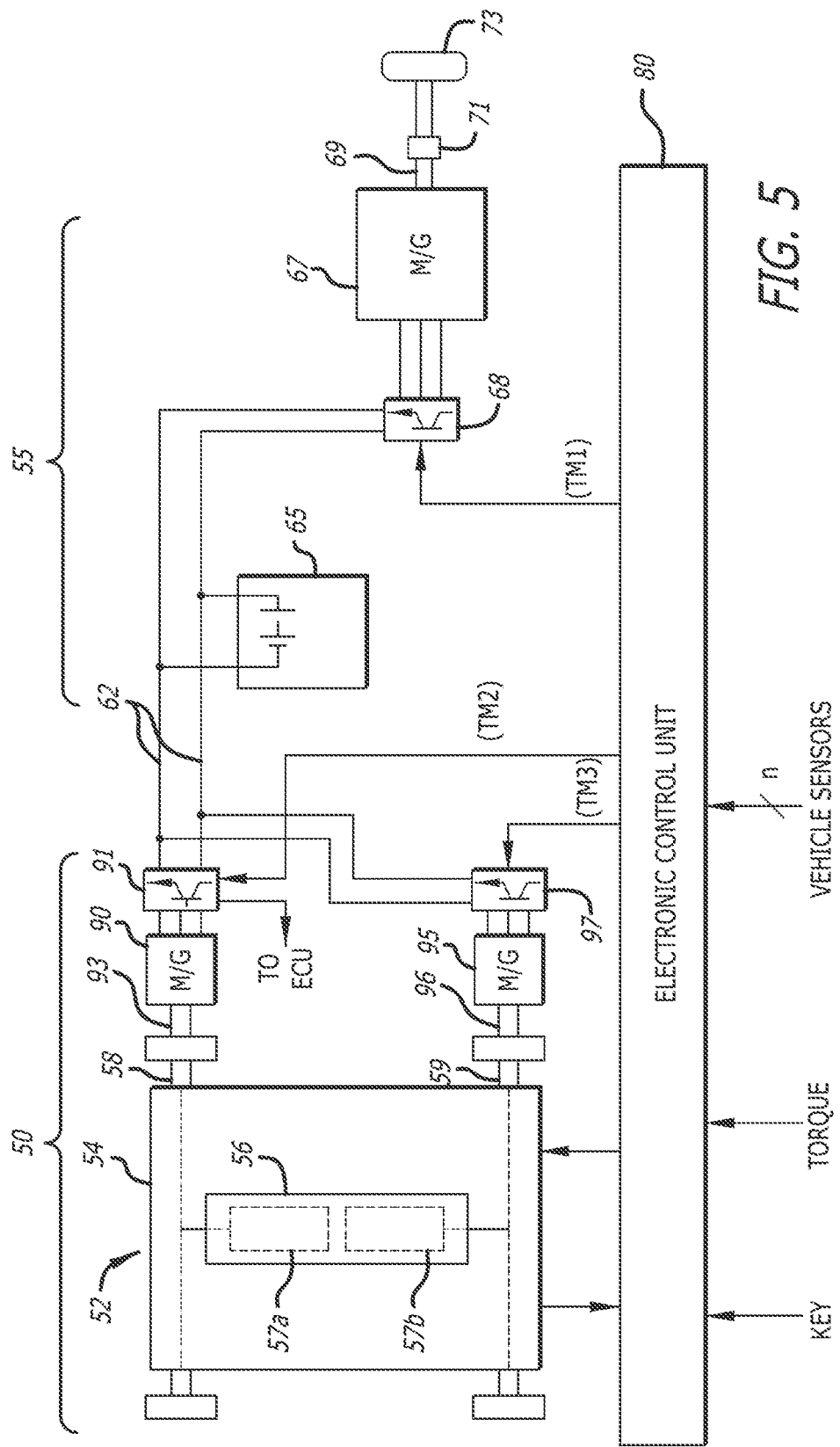
FIG. 5 is a schematic illustration of a third embodiment of a hybrid drive system configured in a series arrangement according to the invention.

In the example shown in FIG. 2, the power transducer device 53 may comprise one or more motor/generator devices with rotating motor shafts mechanically coupled to the opposed-piston engine 52. Further, the two crankshafts 58 and 59 of the opposed-piston engine 52 may or may not be mechanically interlinked. Embodiments of a hybrid drive system according to FIG. 2 are shown in FIGS. 3, 4, and 5.

Figure 3:
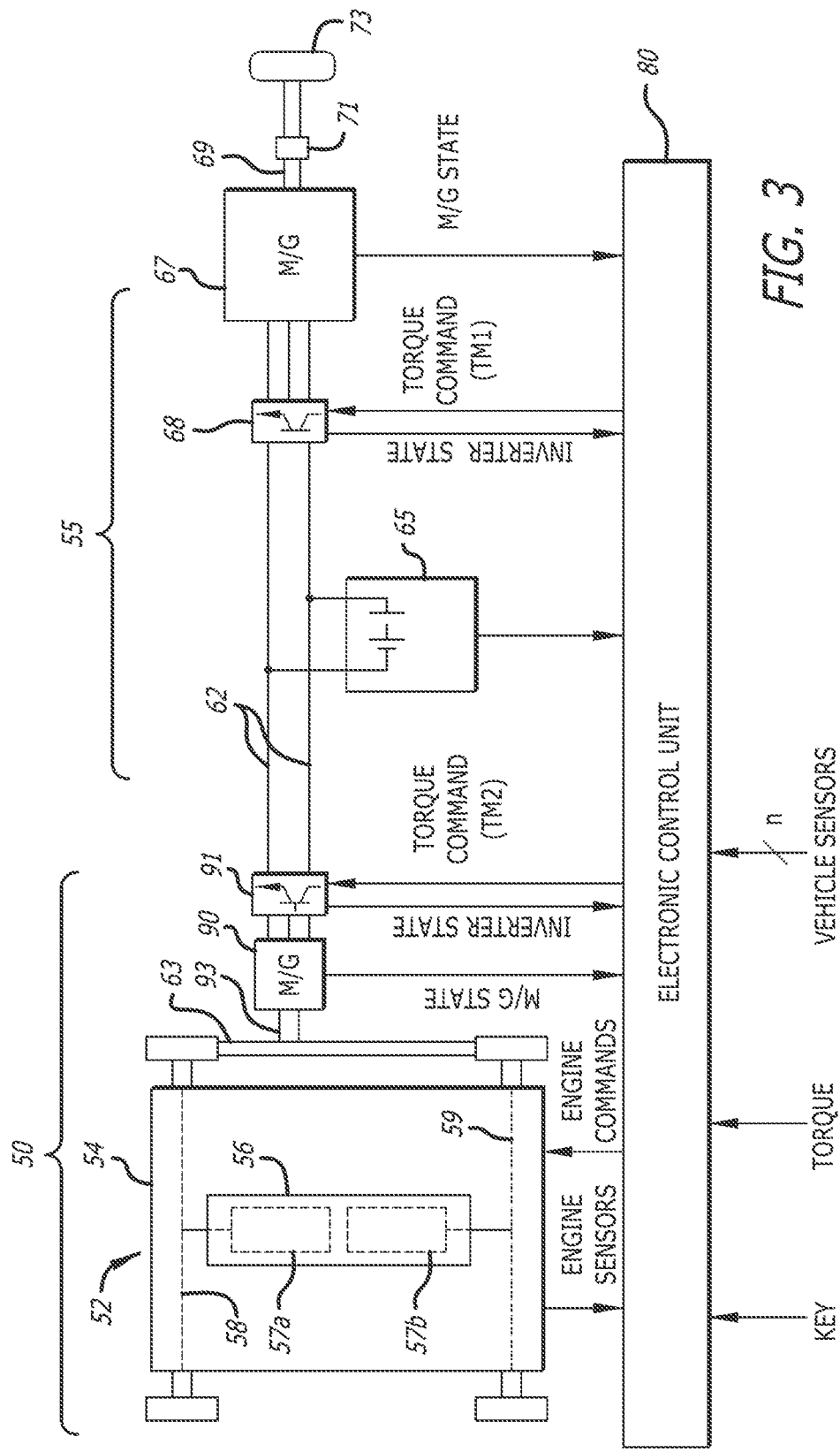
FIG. 3 is a schematic illustration of a first embodiment of a hybrid drive system configured in a series arrangement according to the invention.

FIG. 3 is a schematic illustration of a first embodiment of the invention, in which the opposed-piston, internal combustion engine device 50 is arranged in series with the hybrid powertrain system 55 in a hybrid drive system capable of transmitting power to one or more wheels of a hybrid vehicle. In this embodiment, the opposed-piston engine 52 includes a mechanical connection 63 interlinking the crankshafts 58 and 59. The mechanical connection 63 may comprise a belt, a chain, a gear train, or, possibly, another kind of link. The power transducer device 53 comprises a motor/generator (M/G) device 90 capable of supplying power to, and receiving power from, the battery device 65 via an inverter 91. A rotating motor shaft 93 of an AC motor part of the motor/generator device 90 may be directly coupled, or coupled by a transmission assembly (not shown), to the opposed-piston, internal combustion engine 52 through an idler gear of a gear train, for example, or to either of the crankshafts 58, 59.

The opposed-piston engine 52 is of an internal combustion type which generates power by burning gasoline, diesel fuel, gaseous fuel, or any combination thereof in response to regulation of fuel and air by the ECU 80. The motor/generator device 67 (designated as the first motor/generator device) is a power transducer capable of being operated as either an electric motor or a generator. Similarly, the motor/generator device 90 (designated as the second motor/generator device) is a power transducer capable of being operated as either an electric motor or a generator. In this regard, the motor/generator device 67 is operated principally as a motor, providing output power of the hybrid drive system through its motor shaft 69, when provided electrical energy stored in the battery device 65. It may be the case that the motor/generator device 67 can also operate as a generator in certain hybrid vehicle applications that comprise a regenerative braking system. The motor/generator device 67 receives power from, and may supply power to, the battery device 65 through an inverter 68. The motor/generator device 90 operates as a generator when its motor component is driven by the opposed-piston engine 52 via its motor shaft 93. The electrical power generated thereby may be directed to the battery device 65, or to the motor generator 67 (via the inverter 68), or to both. The motor/generator device 90 supplies power to, and may receive power from, the battery device 65 through an inverter 91. Each of the inverters 68 and 91 is connected to the battery device 65 by way of electrical bus lines 62. The inverters 68 and 91 are constructed so as to enable either of the motor generator devices 67 and 90 to provide power directly to the other and/or to the battery device 65. A motor function of each motor/generator device is regulated by way of its associated inverter. Thus, the inverter 68 controls an amount of electrical power provided to, or obtained from, the motor/generator device 67 according to a magnitude and a polarity of a first Torque Command issued by the ECU 80, and the inverter 91 controls an amount of electrical power obtained from, or provided to, the motor/generator device 90 according to a magnitude and a polarity of a second Torque Command issued by the ECU 80.

The hybrid drive system illustrated in FIG. 3 may be controlled in the manner of a series hybrid by the ECU 80, which may regulate the switching of each of the motor/generator devices 67 and 90 between operation as a motor and as a generator via respective Torque Commands. In a first mode of hybrid drive system operation, with the opposed-piston, internal combustion engine off, the motor/generator device 67 may be operated in the motor mode, with power supplied by the battery device 65. In instances in which the hybrid drive system powers a hybrid vehicle, when the motor/generator device 67, powered by the battery device 65, operates in motor mode, its output would be coupled to drive one or more wheels 71. If the hybrid vehicle is equipped with a regenerative braking system, the motor/generator device 67 may be operated in the generator mode to charge the battery device 65. In a second mode of hybrid drive system operation, with the opposed-piston engine 52 operating, the motor/generator device 67 may be operated in the motor mode, with power supplied by the battery device 65, while the motor/generator device 90, operated in the generator mode, maintains or replenishes the charge of the battery device 65. In a third mode of hybrid drive system operation, with the opposed-piston engine 52 operating, the motor/generator device 67 may be operated in the motor mode, with power supplied by the battery device 65 and the motor/generator device 90, with the motor/generator device 90 operated in the generator mode. In cases where operation of the opposed-piston engine 52 is to be initiated, the motor/generator device 90 may be operated in the motor mode to crank the opposed-piston engine 52.

FIG. 4 is a schematic illustration of a second embodiment of the invention, which is a variation of the first embodiment illustrated in FIG. 3, in which the opposed-piston, internal combustion engine device 50 is arranged in series with the hybrid powertrain system 55 in a hybrid drive system capable of transmitting power to one or more wheels of a hybrid vehicle. In this embodiment, the motor shaft 93 of the second motor/generator device 90 is coupled to the crankshaft 58 (designated as the first crankshaft), and a third motor/generator device 95 with a motor shaft 96 is coupled, via its motor shaft 96, to the crankshaft 59 (designated as the second crankshaft). Thus, in the second embodiment, the power transducer device 53 comprises the second motor/generator device (M/G) 90 and a third motor/generator device (M/G) 95 with an associated inverter 97. In the second embodiment, the opposed-piston engine 52 includes the mechanical connection 63 interlinking the crankshafts 58 and 59. As with the first embodiment, the mechanical connection 63 may comprise a belt, a chain, a gear train, or, possibly, another kind of link.

The motor/generator device 95 operates as a generator when its motor component is driven by the opposed-piston engine 52 via its motor shaft 96. The electrical power generated thereby is either directed to the battery device 65, or to the generator portion of the motor generator device 67 (via the inverter 68), or to both. The motor/generator device 95 supplies power to, and may receive power from, the battery device 65 through an inverter 97, which is connected to the battery device 65 by way of the electrical bus lines 62. The inverter 97 is constructed so as to enable the motor/generator device 96 to provide power directly to, or receive power from, either or both of the other motor/generator devices 67 and 90. A motor function of the motor/generator device 95 is regulated by way of its associated inverter 97. Thus, the inverter 97 controls an amount of electrical power provided to, or obtained from, the motor/generator device 95 according to a magnitude and a polarity of a third Torque Command issued by the control unit 80.

The hybrid drive system illustrated in FIG. 4 may be controlled in the manner of a series hybrid system by the ECU 80, which may regulate the switching of each of the motor/generator devices 67, 90, and 95 between operation as a motor and operation as a generator via respective Torque Commands. In a first mode of hybrid drive system operation, with the opposed-piston engine 52 off, the motor/generator device 67 may be operated in the motor mode, with power supplied by the battery device 65. In instances in which the hybrid drive system powers a hybrid vehicle, when the motor/generator device 67, powered by the battery device 65, operates in motor mode its output would be coupled to drive one or more wheels 71. If the hybrid vehicle is equipped with a regenerative braking system, the motor/generator device 67 may be operated in the generator mode to charge the battery device 65. In a second mode of hybrid drive system operation, with the opposed-piston engine 52 operating, the motor/generator device 67 may be operated in the motor mode, with power supplied by the battery device 65, while both the motor/generator device 90 and the motor/generator device 95 are operated in the generator mode to maintain the charge of the battery device 65. In a third mode of hybrid drive system operation, with the opposed-piston engine 52 operating, the motor/generator device 67 may be operated in the motor mode, with power supplied by the battery device 65, the motor/generator device 90, and the motor/generator device 95, with the motor/generator device 90 and the motor/generator device 95 operated in the generator mode. In cases where operation of the opposed-piston 52 is to be initiated, either the motor/generator device 90 or the motor/generator device 95 may be operated in the motor mode to crank the opposed-piston engine 52.

FIG. 5 is a schematic illustration of a third embodiment of the invention, which is a variation of the second embodiment illustrated in FIG. 4, in which the opposed-piston, internal combustion engine device 50 is arranged in series with the hybrid powertrain system 55 in a hybrid drive system capable of transmitting power to one or more wheels of a hybrid vehicle. In this embodiment, the motor shaft 93 of the second motor/generator device 90 is coupled to the first crankshaft 58, and the motor shaft 96 of the third motor/generator device 95 is coupled to the second crankshaft 59. However, in the third embodiment, the opposed-piston engine 52 does not include, and thus excludes, any mechanical connection interlinking the crankshafts 58 and 59.

As per FIGS. 2-5, the crankshafts 58 and 59 are coupled to one or more motor/generator devices. How such coupling is constructed is a matter of design choice. In this regard, the rotating motor shaft of a respective motor/generator device may be coupled directly to a crankshaft, or to an arrangement linking the crankshafts, by a belt, by a gear arrangement which may possibly include a clutch, or by another transmission arrangement.

A hybrid drive system comprising an opposed-piston, internal combustion engine according to any one of the three embodiments of FIGS. 3, 4, and 5 uses both of the two crankshafts 58 and 59 to generate electricity. This makes the system suitable for operation in a series hybrid or range extender hybrid application.

Figure 6:
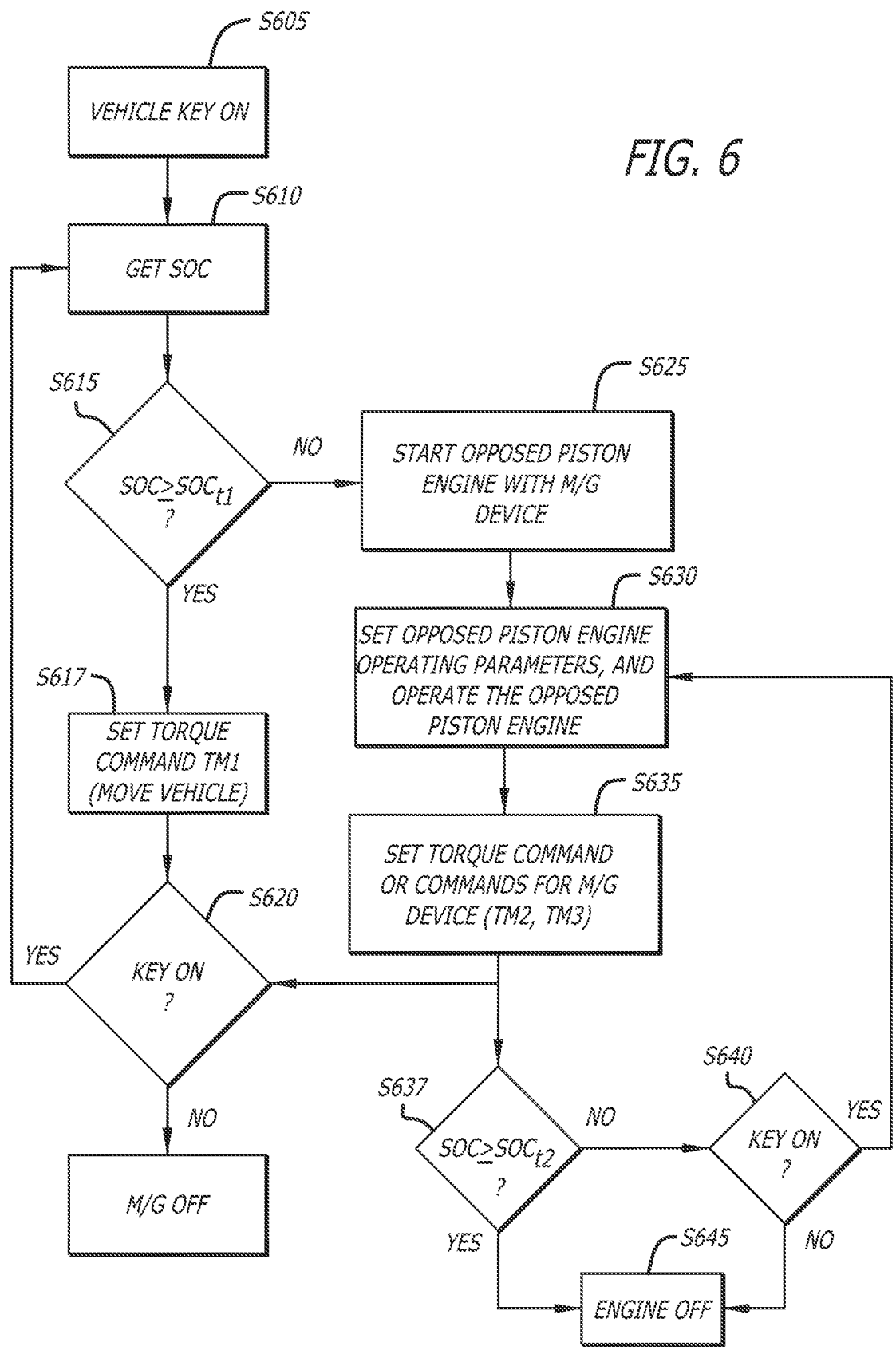
FIG. 6 is a flowchart illustrating an example of a general control procedure for operating a hybrid vehicle powered by a hybrid drive system that comprises an opposed-piston, internal combustion engine according to the invention.

FIG. 6 is a flowchart illustrating an example of a general control procedure for operating a hybrid vehicle equipped with a hybrid drive system according to any of the embodiments illustrated in FIGS. 2-5. When the hybrid vehicle is off, a vehicle "key on" signal (ignition signal, start signal) input to (received by) the ECU 80 in step S605 initiates operation of the hybrid drive system. Initialization of the hybrid vehicle includes a determination by the ECU 80 of a level of charge held by the battery device 65 (state of charge, or SOC). This is performed by execution of a GET SOC procedure in step S610 in which the level of charge held by the battery device 65 is measured by the ECU 80. In step S615, the ECU 80 evaluates whether the level of charge (SOC) is sufficient to enable movement of the hybrid vehicle by the motor/generator device 67 and to power various other vehicle systems. The evaluation carried out by the ECU 80 in step S615 may comprise comparing the measured SOC with an initial state of charge threshold $SOC_{t1}$. Presuming that the level of charge held by the battery device 65 (the measured SOC) is at least equal to (or greater than) the initial state of charge threshold $SOC_{t1}$, the ECU 80 in step S617 issues a torque command Tm1 conditioned to cause the motor/generator 67 to move the hybrid vehicle when requested by a driver or by an autonomous, self-driving vehicle. Step S620, represents a continuous check by the ECU 80 for the vehicle "key on" signal input to (received by) the ECU 80 the absence of which causes the ECU 80 issue a torque command Tm1 conditioned to cause the motor/generator 67 to stop operation, thereby preventing movement of the hybrid vehicle. Returning to step S615, in the event that the level of charge held by the battery device 65 (the measured SOC) is less than the initial state of charge threshold $SOC_{t1}$, the ECU 80 in step S625 initiates operation of the opposed-piston, internal combustion engine 52 in order to generate electrical power for provision to the hybrid power system 55. The ECU 80 starts the engine 52 by causing the power transducer device 53 to crank the engine 52. As the opposed-piston, internal combustion engine 52 is cranked, the ECU 80, in step S630, sets operating parameters (engine speed, boost, airflow, fuel, etc.) that cause the engine 52 to operate at a desired operating point. When the engine 52 is brought to a desired operating point, the ECU 80 switches the power transducer device 53 at step S635 to provide generator operation to the opposed-piston, internal combustion engine 52 and electrical power to the electrical bus lines 62, whereby the level of charge of the battery device 65 is replenished. Depending on the construction of the power transducer device 53 the ECU 80 may enable such switching with one torque command (Tm2 for the embodiment of FIG. 3) or with two torque commands (Tm2 and Tm3 for either of the embodiments of FIGS. 4 and 5). At this point in the general control procedure, if the ECU 80 has received a torque demand from a driver or from a self-driving controller, the ECU 80 may also drive the motor/generator 67 with a torque command (Tm1). Once the engine 52 is operating and generating power for the hybrid power train system 55, the ECU 80, in step S637, checks the level of charge (SOC) of the battery device 65 against a second state of charge threshold $SOC_{t2}$; preferably, $SOC_{t2}$ has a higher value than $SOC_{t1}$ ($SOC_{t2} > SOC_{t1}$). For so long as the level of charge held by the battery device 65 (the measured SOC) is less than the second state of charge threshold $SOC_{t2}$, and the "key on" signal is maintained (step S640), the ECU 80 will maintain the engine 52 in operation by the loop S630, S635, S637, S40 ("the charging loop"). When the level of charge held by the battery device 65 (the measured SOC) is greater than the second state of charge threshold $SOC_{t2}$, the ECU 80 will follow the negative exit from step S637 and turn the engine 52 off in step S645. Similarly, if the ECU 80 in step S640 fails to detect the vehicle "key on" signal, the ECU 80 will follow the negative exit from step S640 and turn the engine 52 off in step S645.

Although FIG. 6 illustrates control of the state of operation of the opposed-piston, internal combustion engine 52 in response to the SOC and a vehicle key signal, this should not exclude use of other control factors which require more detailed analysis by the ECU 80. In this regard, the ECU 80 may also turn the opposed-piston, internal combustion engine 52 on or off in response to information received from connected and automated vehicles and/or in response to algorithmic, machine-learning activity employing predictive methods to analyze future vehicle requirements.

Embodiments of the invention have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims.

We claim:
1. A hybrid drive system, comprising:
an opposed-piston, internal-combustion engine comprising a first crankshaft, a second crankshaft, a mechanical connection interlinking the first crankshaft and the second crankshaft, at least one cylinder, and a pair of pistons disposed in a bore of the cylinder for opposed sliding movement therein, a first piston of the pair of pistons being coupled to the first crankshaft and the second piston of the pair of pistons being coupled to the second crankshaft;
a power transducer device coupled to be driven by the opposed-piston, internal combustion engine; and,
a hybrid powertrain system configured to receive power from the power transducer device;
in which the hybrid powertrain system comprises a first electric motor/generator device and the power transducer device comprises a second electric motor/generator device and a third electric motor/generator device; and,
in which a motor shaft of the second electric motor/generator device is coupled to the first crankshaft, and a motor shaft of the third electric motor/generator device is coupled to the second crankshaft.

2. A hybrid drive system, comprising:
an opposed-piston, internal-combustion engine comprising two crankshafts, at least one cylinder, a pair of pistons disposed in a bore of the cylinder for opposed sliding movement in the bore;
a first power transducer with a motor shaft coupled to provide mechanical torque and rotation to one or more wheels of a vehicle;
a second power transducer adapted to convert mechanical rotation of the crankshafts to power; and,
a power storage device coupled to receive and store power from the second power transducer and to provide stored power to the first power transducer.

3. The hybrid drive system of claim 2, further comprising one of a driveshaft, an axle, and a hub flange for rotatably coupling the motor shaft of the first power transducer to at least one wheel of a vehicle.

4. The hybrid drive system of claim 2, wherein the first power transducer comprises a first electric motor/generator and the second power transducer comprises a second electric motor/generator.

5. The hybrid drive system of claim 2, wherein the power storage device comprises an electric battery device.

6. The hybrid drive system of claim 2, further comprising a third power transducer adapted to convert mechanical rotation of the crankshafts to power, and the power storage device is coupled to receive and store power from the third power transducer.

7. The hybrid drive system of claim 6, wherein the first power transducer comprises a first motor/generator, the second power transducer comprises a second motor/generator, the third power transducer comprises a third motor/generator, and the power storage device comprises an electrical battery.

8. A range-extended drive system, comprising:

a driveshaft;

an electric driving device configured to provide mechanical torque and rotation to the driveshaft, and an opposed-piston, internal combustion engine with two crankshafts, and configured to provide electrical energy for the electric driving device to an electrical energy-accumulating device configured to supply power to the electric driving device;

in which the opposed-piston, internal combustion engine further comprises at least one motor/generator adapted to convert mechanical rotation of the crankshafts to electrical power; and, in which the range-extended drive system further comprises a control mechanization configured to cause the at least one motor/generator to crank the opposed-piston engine for starting the opposed-piston engine.

* * * * *